United States Patent
Salvestro

(10) Patent No.: US 8,358,431 B2
(45) Date of Patent: Jan. 22, 2013

(54) ORTHOGONALITY CORRECTIONS FOR DIFFERENT SCANNING DIRECTIONS

(75) Inventor: Aldo Salvestro, Burnaby (CA)

(73) Assignee: Eastman Kodak Company, Rochester, NY (US)

(*) Notice: Subject to any disclaimer, the term of this patent is extended or adjusted under 35 U.S.C. 154(b) by 994 days.

(21) Appl. No.: 12/397,403

(22) Filed: Mar. 4, 2009

(65) Prior Publication Data
US 2010/0225976 A1 Sep. 9, 2010

(51) Int. Cl.
*G06F 15/00* (2006.01)
(52) U.S. Cl. ............. 358/1.18; 347/40; 347/78; 347/80; 358/1.8
(58) Field of Classification Search .............. 347/40, 347/78, 80; 358/1.8, 1.18
See application file for complete search history.

(56) References Cited

U.S. PATENT DOCUMENTS

| 6,081,316 A | 6/2000 | Okamura et al. |
| 6,249,306 B1 * | 6/2001 | Isono et al. ................... 347/233 |
| 6,394,577 B1 * | 5/2002 | Wen et al. ...................... 347/43 |
| 7,330,202 B2 | 2/2008 | Schweger et al. |
| 2007/0024668 A1 * | 2/2007 | Folkins ........................... 347/43 |

FOREIGN PATENT DOCUMENTS

EP 1 211 882 A2 6/2002

* cited by examiner

*Primary Examiner* — David K Moore
*Assistant Examiner* — Peter K Huntsinger
(74) *Attorney, Agent, or Firm* — Nelson Adrian Blish

(57) ABSTRACT

The present invention provides methods for forming an image with orthogonality corrected image data. A recording head includes a plurality of recording channels which form an image on media. Each recording channel forms an image pixel column. An image data file includes a plurality of image data columns. Different portions of each of a first image data column and a second image data column are assigned to different recording channels. First image data from a portion of the first image data column is substituted with zero image data and is assigned along with image data from another portion of the second image data column to a first recording channel which forms a first image pixel column. The first image data can also be assigned to a second recording channel which forms a second image pixel column. The second image data column is formed while scanning along a direction different than the scanning direction employed to form the first image pixel column.

15 Claims, 12 Drawing Sheets

ORTHOGONALITY CORRECTIONS FOR DIFFERENT SCANNING DIRECTIONS

CROSS REFERENCE TO RELATED APPLICATIONS

Reference is made to commonly-assigned U.S. patent application Ser. No. 12/397,381 (now U.S. Publication No. 2010/0225956), filed Mar. 4, 2009, entitled ORTHOGONALITY CORRECTION EMPLOYING SUBSTITUTED IMAGE DATA, by Salvestro; U.S. patent application Ser. No. 12/397,389 (now U.S. Publication No. 2010/0225981), filed Mar. 4, 2009, entitled IMAGING WITH HELICAL AND CIRCULAR SCANS, by Salvestro; and U.S. patent application Ser. No. 12/397,395 (U.S. Publication No. 2010/0225982), filed Mar. 4, 2009, entitled SELECTIVELY APPLIED ORTHOGONALITY CORRECTIONS, by Salvestro, the disclosures of which are incorporated herein.

FIELD OF THE INVENTION

The present invention is related to forming images with combined helical scanning and circular scanning techniques. In particular, various embodiments of the present invention relate to correcting distortions arising during the printing of graphical elements and electrical components on a printable surface.

BACKGROUND OF THE INVENTION

Various printing technologies have been extensively employed to form graphical elements on various substrates. For example, some printing methods (e.g. ink-jet printing) print various graphical elements by directing image forming fluids towards a printable surface. Some printing methods utilize transfer surfaces to apply colorants to a printable surface to form a graphical element thereon. The printable surface can form part of a printed substrate (e.g. paper or polymeric film) or can form part of an intermediate component adapted to transfer the colorant from the printable surface to the printed substrate (e.g. a blanket cylinder on a press). In either case, a colorant pattern is transferred to the printed substrate to form an image thereon. Various media including printing elements such as printing plates, printing sleeves, printing cylinders and the like include transfer surfaces. Transfer surfaces are used in various printing processes which can include, but are not limited to, offset, waterless offset, flexographic, gravure processes, or variations thereof.

The ability of these and other printing techniques to produce relatively low cost graphical images has lead to considerable interest in the field of printable electronics. This interest is particularly relevant in electronics, display and energy industries which require the formation of various patterns of conductive, semi-conductive and/or dielectric materials to form various functional entities including electronic circuits. The functional entities can include conductors, resistors, inductors, capacitors, rectifiers, transistors, opto-electronic devices, microwave devices, or acoustical devices by way of non-limiting example. Printing techniques are being considered to address the various needs of these industries. For example, some printing techniques have the potential to address the relatively large size requirements and low cost demands of various photovoltaic power assemblies. Additionally, various printing techniques are considered well suited for transferring patterns to flexible substrates which increases their potential for use in flexible display applications.

There is also a demand to combine printed graphical images with printed electronics. For example, there is a desire to replace bar-codes in packaging applications with more readily readable RFIDs. There is desire to create "smart packaging" and "smart publications" that can enhance the functionality provided between these articles and the customer. Mechanical, chemical, electrical or electronically-driven functions can enhance the desirability, usability or effectiveness of these articles in some way. Examples can include time or temperature sensitive food quality labels, self-heating or self-cooling containers for beverages and foods, or articles with electronic displays displaying select information based on a particular customer's desire. Accordingly, there is a desire that these articles be formed with printing techniques that can print in addition to various graphical elements, electronic circuits comprising various passive and active components including conductors, resistors, inductors, capacitors, transistors, displays, sensors, batteries, microphones, and the like.

Typically, some media undergo various processes to render their transfer surfaces in a suitable configuration for use in a printing process. These processes can include various image forming processes. For example, exposure processes are used to form images on a surface of media that has been suitably treated so as to be sensitive to light or heat radiation. One type of exposure-based image forming process employs film masks. Specialized recording apparatus can also be employed to directly form images on a surface of the media.

Image forming processes can include various scanning techniques to form various sub-images that are combined to form a desired image. For example, scanning can include establishing relative movement between a recording head and media as the recording channels of the recording head are activated to form corresponding image pixels on the media. A raster line or image pixel column comprising a series of image pixels is formed along a scan direction by a given recording channel as relative movement between the given recording channel and the media is established. Relative movement can include moving one or both of the recording channels and the media. The various raster lines of image pixels combine to form an image swath. In this manner various image portions are formed in corresponding image swaths. In some cases, scanning can be performed while deflecting radiation beams emitted by recording channels relative to media. In some cases, scanning can be performed while deflecting image forming material emitted by recording channels relative to media.

Recording apparatus known as computer-to-plate systems have been developed to form images on media. These recording apparatus can include various configurations including external drum, internal drum, and flat-bed configurations. The names of these different configurations typically refer to a configuration of a media support onto which media is positioned while forming images thereon. For example, an external drum recording system includes a cylindrical or drum-like media support onto which media is positioned while forming images thereon. Images are typically formed as the drum rotates about a rotation axis along a circumferential or main-scan direction while a recording head is moved along a sub-scan direction which is generally parallel to the rotation axis. Images are typically formed on the media by helical scanning techniques in which the movement of both the drum and the recording head are controlled to cause imaging beams emitted by the recording head to be scanned over the media along a spiral or helical path. Various external drum recording systems employing helical scanning techniques are examples of skewed recording systems. Skewed recording systems typically scan along a direction that is skewed relative to a desired orientation of an image to be formed during the scanning.

Various image distortions can arise when skewed recording systems are employed to form images. For example, in various external drum recording systems, helical scans are oriented from the main-scan axis by a skew angle determined by the movement of the recording head along the sub-scan axis during each revolution of the drum. Consequently, desired orthogonality characteristics of a rectangular shaped image can be adversely impacted as helical scanning causes the formed image to take a parallelogram shape.

Various techniques have been employed in the art to correct for orthogonality distortions. For example, U.S. Pat. No. 6,081,316 (Okamura et al.) describes a technique to correct for distortions caused by helical scanning in which image data is pre-distorted to compensate for the skewed imaging. In particular, an array of image data is shifted in a memory in an opposite direction to the helical scans to arrange the image data into an array having an "oppositely inclined" parallelogram structure. This pre-distorted image data compensates for the helical scanning to produce an image that substantially maintains the desired orthogonality requirements. Other orthogonality correction techniques include reading out image data along a read path running through the image data file at an angle corresponding to the helical scan angle. Orthogonality correction techniques are taught in U.S. Pat. No. 7,330,202 (Schweger et al.) and in European Patent Application 1 211 882.

FIGS. 1A and 1B show various conventionally formed skewed image swaths comparing imaged features which have selectively undergone orthogonality correction during their formation. In particular, FIG. 1A shows a typical helically formed image swath (i.e. helical image swath 100A) formed while not employing orthogonality correction techniques while FIG. 1B shows a typical helically formed image swath (i.e. helical image swath 100B) that is formed while employing a conventional orthogonality technique. Both helical image swaths 100A and 100B are shown skewed with respect to main-scan axis MSA by a helical scan angle θ. For clarity, both helical image swaths 100A and 100B are shown in an unwound or "flat" orientation. It is understood that each of helical image swaths 100A and 100B would helically wrap around the media support if formed in an external drum recording apparatus. Helical image swath 100A includes an image feature 47A that extends along the length of the swath. Although it is desired that image feature 47A extend along a direction that is parallel to a main-scan axis MSA, helical scanning techniques cause image feature 47A to assume a skewed orientation with respect to main-scan axis MSA. This skewed orientation is corrected in FIG. 1B. In this case, although helical image swath 100B is also shown in a skewed orientation with main-scan axis MSA (i.e. in the same orientation as helical image swath 100A), the employed orthogonality correction technique caused image feature 47B to be formed with a desired orientation (i.e. shown as a broken line 13) that is substantially parallel to main-scan axis MSA.

Analysis of FIG. 1B shows that one effect of the employed orthogonality correction technique is that image feature 47B is formed from a plurality of image feature portions 48 (i.e. image feature portions 48B in this case) that are arranged in a "stair-case" fashion. In this case, portions of image data have been read out along various skewed read paths that correspond to helical scan angle θ. The image data in each of the skewed read paths results in stair-case appearance of image feature 47B.

In many graphics-based applications, stair-cased image feature 47B would typically be perceived by the unaided human eye to appear to extend along direction of broken line 13 essentially in an un-interrupted fashion thereby rendering the employed orthogonality correction technique acceptable. There are exceptions however where stair-case image feature 47B would be noticeable to the un-aided human eye and would be considered objectionable. For example, in some lenticular applications, visible artifacts may be visible at the boundaries of the lenticular lenses. In some cases the lenticular lenses act as magnifying elements that make the stair-case effect more pronounced. In some applications, the formation of various security features (e.g. security strips) on various documents including currency would not be acceptable if these security features were formed with a staircase arrangement of image feature portions.

The functionality of the various printed electronic elements is of paramount importance in the field of printed electronics. Deviations in the conductive, dielectric or semiconductive properties of the printed electronic elements can adversely impact the functionality of the electronics that they are incorporated into. For example, if image feature 47B corresponds to a printed conductive trace, very high areas of electrical resistance would be encountered at various staircase shifts points associated with the employed orthogonality correction technique. This problem becomes especially pronounced as the demand for thinner conductors on the order of one or two pixels wide increases. Other electronic elements corresponding to orthogonality corrected image features similar to image feature 47B can suffer from similar problems.

There is a desire for improved image forming techniques that can combine various scanning techniques to improve image forming throughput while lessening image distortions.

There is a desire for improved orthogonality correction techniques that can lessen image distortions while scanning along different directions.

There is a desire for improved image forming techniques that can combine electronic and graphical elements on a printed article with reduced occurrences of functionality problems and/or visual artifacts.

SUMMARY OF THE INVENTION

Briefly, according to one aspect of the present invention a method for forming an image includes providing a media support adapted to receive media; providing a recording head comprising a plurality of recording channels, wherein each recording channel is adapted to form an image pixel column while scanning over the media; providing an image data file comprising a plurality of image data columns including a first image data column and a second image data column; assigning different portions of each of the first image data column and the second image data column to different recording channels; substituting first image data assigned to a first recording channel from the first image data column with zero image data, and operating the first recording channel to form a first image pixel column in accordance with at least the zero image data and second image data assigned to the first recording channel from the second image data column; and operating the recording head to form the image.

BRIEF DESCRIPTION OF THE DRAWINGS

Embodiments and applications of the invention are illustrated by the attached non-limiting drawings. The attached drawings are for purposes of illustrating the concepts of the invention and may not be to scale.

DETAILED DESCRIPTION OF THE INVENTION

Throughout the following description specific details are presented to provide a more thorough understanding to persons skilled in the art. However, well-known elements may not have been shown or described in detail to avoid unnecessarily obscuring the disclosure. Accordingly, the description and drawings are to be regarded in an illustrative, rather than a restrictive sense.

Figure 2:
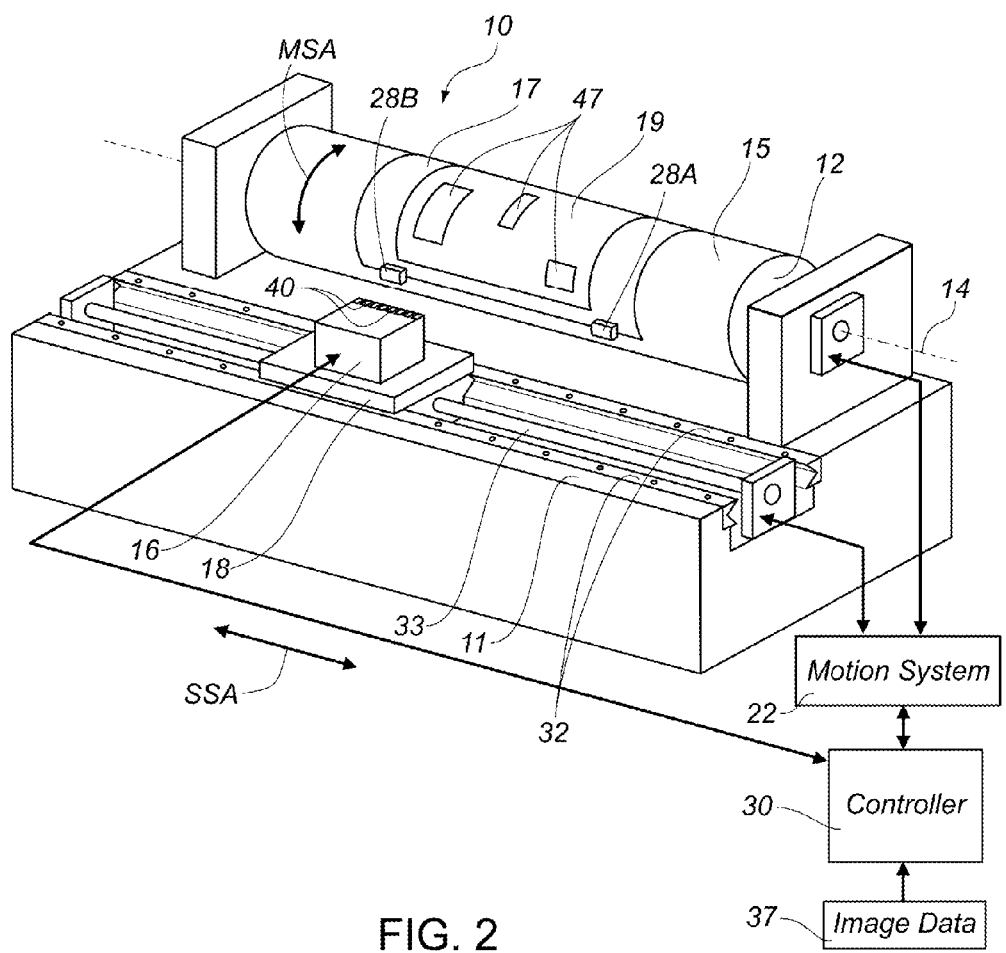
FIG. 2 shows a partially schematic view of a recording apparatus employed in an example embodiment of the invention.

FIG. 2 schematically shows a recording apparatus 10 for forming an image 19 on media 17 as per an example embodiment of the invention. Media 17 can take various forms including by way of example, various recording media including printing elements such as printing plates, printing sleeves, printing cylinders and other substrates comprising suitable surfaces for forming images thereon.

Recording apparatus 10 includes a media support 12, which in this example embodiment is arranged according to an external drum configuration. Accordingly, in this example embodiment media support 12 comprises a drum-like or cylindrical shape adapted to rotate about a rotation axis 14. Other examples embodiments of the invention can include other forms of media supports which can include internal drum configurations or flat surface configurations.

Media 17 is supported on a cylindrical surface 15 of media support 12. One or more portions of media 17 are secured to cylindrical surface 15 by clamping members 28A and 28B. Other example embodiments of the invention can secure media 17 to media support 12 by additional or alternative methods. For example, a surface of media 17 can be secured to cylindrical surface 15 by various methods including providing a low pressure source (e.g. suction) between the surfaces. In other example embodiments, media 17 can take the form of a hollow sleeve-like structure (e.g. a printing sleeve) that is positioned over and held onto media support 12 by various methods known in the art. In some example embodiments, media support 12 and media 17 are combined into a single assembly. Combined media support/media assemblies can take the form of various printing plate cylinders such as gravure cylinders for example.

Recording apparatus 10 includes recording head 16 which is movable relative to media support 12. In this example embodiment of the invention, recording head 16 is mounted on movable carriage 18. Media support 12 rotates about rotation axis 14 relative to support 11. Carriage 18 is movable relative to support 11 in a manner in which recording head 16 can be moved along a path substantially aligned with rotation axis 14. Motion system 22 is used to provide relative movement between recording head 16 and media support 12. Motion system 22 (which can include one or more motion systems) includes any suitable drives, encoders, and sensors needed for the required movement. In this example embodiment of the invention, motion system 22 is used to rotationally move media support 12 along a path aligned with a main-scan axis MSA and to move recording head 16 along a path aligned with sub-scan axis SSA. Guide system 32 is used to guide carriage 18 which is moved under the influence of transmission member 33. In this example embodiment of the invention, transmission member 33 includes a screw that moves carriage 18 as the screw rotates.

Those skilled in the art will realize that various forms of relative movement between recording head 16 and media support 12 are possible. For example, in some cases both recording head 16 and media support 12 are moved at the same time. In some cases recording head 16 can be stationary while media support 12 is moved. In other cases, media support 12 is stationary and recording head 16 is moved. In some cases, one or both of recording head 16 and media support 12 can be controlled to move along opposite directions in each of their respective paths of movement. In some cases, one or both recording head 16 and media support 12 can be controlled to move in a reciprocating fashion as in a flat-bed recording apparatus for example. Separate motion systems 22 can also be used to operate different systems within recording apparatus 10.

Controller 30, which can include one or more controllers is used to control one or more systems of recording apparatus 10 including, but not limited to, various motion systems 22 used by media support 12 and carriage 18. Controller 30 can also control media handling mechanisms that can initiate the loading and unloading of media 17 to and from media support 12. Controller 30 can also provide image data 37 to recording head 16 and control recording head 16 to form images in accordance with this data. Various systems can be controlled using various control signals and by implementing various methods. Controller 30 can be configured to execute suitable software and can include one or more data processors, together with suitable hardware, including by way of non-limiting example: accessible memory, logic circuitry, drivers, amplifiers, A/D and D/A converters, input/output ports, and the like. Controller 30 can comprise, without limitation, a microprocessor, a computer-on-a-chip, the CPU of a computer or any other suitable microcontroller.

In this example embodiment, recording head 16 includes plurality of recording channels 40. The plurality of recording channels 40 can be arranged in various configurations including various array configurations. An array of recording channels 40 can include a one dimensional or a two dimensional array of the recording channels. Each recording channel 40 is individually controllable an image pixel (not shown) on media 17 in accordance with specific image information provided by image data 37. As used herein, image pixel refers to a single unit element of image that can be formed on media 17. In the present invention, various image pixels will be combined with other image pixels to form various image features 47. Image pixels can be combined with one another to form various patterns of image pixels including halftone patterns, stochastic patterns and hybrid patterns (i.e. patterns that include halftone and stochastic patterns) that can used in the formation of various image features 47 especially when the image features 47 correspond to graphical elements.

Recording channels 40 can be controlled to form images on media 17 by different methods. For example, in various inkjet applications, recording channels 40 can include various nozzle structures that are operable for emitting drops of image forming material onto an imagable surface. Each drop that is transferred to the imagable surface can be used in the formation of an image pixel. Image forming materials can include colorants, dye based compositions, pigment based compositions, photo-sensitive compositions and thermo-sensitive compositions, for example. In this illustrated embodiment, recording channels 40 are controlled to emit radiation beams (not shown) to form corresponding image pixels. Radiation beams can be emitted by various methods. For example, in this illustrated embodiment recording head 16 includes a radiation source such as a laser (not shown) which directs radiation onto a spatial light modulator (also not shown). The channels of the spatial light modulator are selectively controlled to transform the radiation into a plurality of radiation beams. Various optical elements (not shown) project the radiation beams onto media 17 to form corresponding image pixels.

Radiation beams can be used to form image 19 on media 17 by different methods. For example, radiation beams can be used to image-wise ablate a surface of media 17. Radiation beams can be used to cause an image-wise transference of an image-forming material from a donor element to a surface of media 17 (e.g. a thermal transfer process). Media 17 can include an image modifiable surface, wherein a property or characteristic of the modifiable surface is changed when irradiated by a radiation beam emitted by a recording channel 40. A radiation beam can undergo a direct path from a radiation source to media 17 or can be deflected by one or more optical elements towards the media.

Once an image 19 is formed, media 17 can undergo additional processing steps. For example, many types of media 17 undergo various chemical processing steps to amplify a difference between imaged and non-imaged portions of the media. Additional processing steps can also include drying steps, gumming steps and steps that involve the formation of registration features on the media 17. The choice of processing steps employed is typically motivated by the type of media 17 that is processed.

Figure 3:
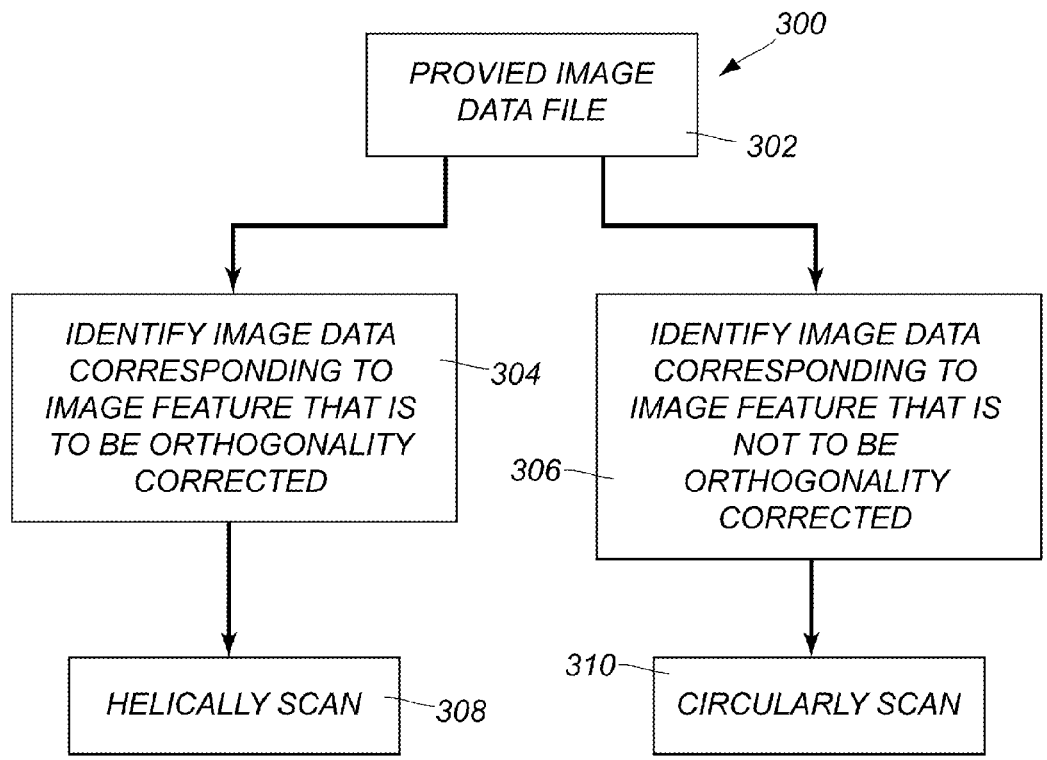
FIG. 3 shows a flow diagram representing a method as per an example embodiment of the invention.

FIG. 3 shows a flow diagram representing a method 300 as per an example embodiment of the invention. Although, the illustrated method refers to recording apparatus 10, it is to be understood that other suitable image forming apparatus can just as readily be used in various embodiments of the invention.

In step 302 an image data file 38 is provided to controller 30. Image data file 38 includes various arrangements of image data 37. Each of the arrangements of image data can be organized in various manners. In some example embodiments, various image data 37 is provided for the formation of an image feature 47 corresponding to a graphical element that is to be formed. A graphical element comprising a desired color attribute can be formed by various techniques including by combining various patterns of different colors. In many printing applications a graphical element can be formed by transferring various colorants to a substrate. Typically, colorants including cyan (C), magenta (M), yellow (Y), and black (B) are employed. Arrangements of image data 37 corresponding to a required transference of each colorant is typically referred to as a color separation. In some example embodiments, other color schemes are employed. In some example embodiments, color schemes employing special colors typically referred to as spot colors are employed.

In some example embodiments, various image data 37 is provided for the formation of an image feature 47 corresponding to an electrical element that is to be formed. Various electrical elements can be formed by transferring one or more layers of functional materials to a substrate. Functional materials can include conductive, semi-conductive or dielectric materials for example. Accordingly, image data 37 corresponding to a particular image feature 47 can be arranged in a functional separation according to a particular functional requirement associated that particular image feature 47. In some example embodiments of the invention, each arrangement of image data 37 is provided in a sub-file in image data file 38. In some embodiments of the present invention, image data 37 corresponding to a graphical element will be provided in a different sub-file than a sub-file that includes image data 37 corresponding to an electrical element. In other example embodiments, image data 37 corresponding to each of a graphical element and an electrical element are contained in a same sub-file.

In many cases, the number of recording channels 40 is insufficient to completely form image 19 during a single image forming operation. Accordingly, image 19 is formed by merging multiple sub-images together, each of the sub images being formed during a corresponding image forming operation. Sub-images can be formed in different manners. In this example embodiment of the invention, each sub-image is formed during a scanning operation. A sub-image formed by scanning typically includes an arrangement of image pixel columns referred to as an image swath.

Figure 4A:
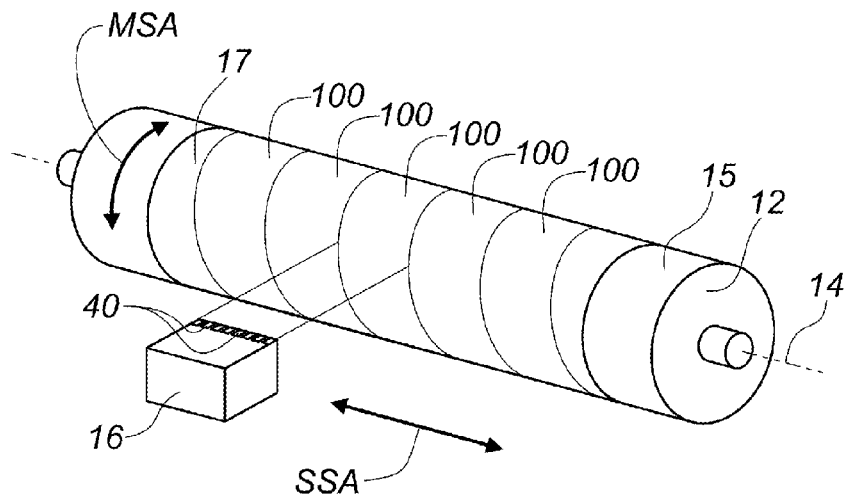
FIG. 4A shows an example of helical image swaths formed on a cylindrical surface.

Different scanning techniques can be employed to form image swaths. For example, as shown in FIG. 4A, helical scanning techniques can be employed to form helical image swaths 100 which are formed in a spiral or helical fashion around a surface comprising a cylindrical shape. In this example embodiment, helical image swaths 100 can be formed when controller 30 causes recording head 16 to emit radiation beams while simultaneously causing recording head 16 to move along a direction of sub-scan axis SSA and media support 12 to move along a direction of main-scan axis MSA. In this regard, scanning occurs along both a main-scan direction and along a sub-scan direction. The movement of recording head 16 and media support 12 can be controlled to form a continuous series of helical image swaths 100. As shown in FIG. 4A each helical image swath 100 is skewed with respect to main-scan axis MSA. Selected parts of recording apparatus 10 have been removed for clarity in FIG. 4A.

It is to be noted that other forms of skewed scanning techniques similar to helical scanning techniques can be used in various embodiments of the present invention. Skewed scanning techniques need not be limited to external drum configurations but can also be employed with other configurations of recording apparatus. For example, in some internal drum image forming apparatus, media is positioned on a concave surface of a media support while a radiation beam is directed towards an optical deflector positioned along a central axis of the media support. The optical deflector is rotated while moving along central axis to cause the radiation beam to follow a spiral path on the surface of the recording media.

Figure 4B:
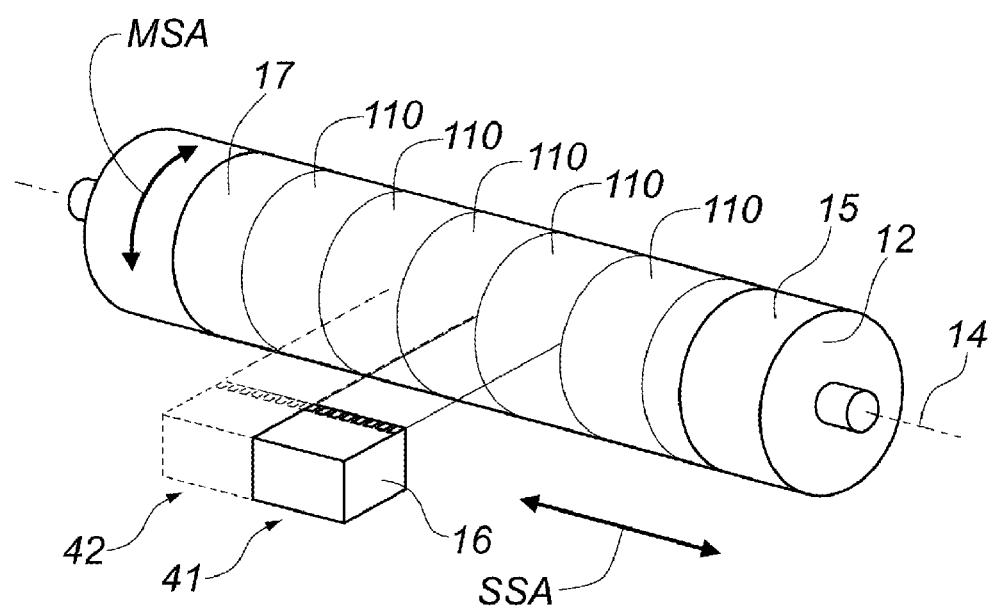
FIG. 4B shows an example of circular image swaths formed on a cylindrical surface.

Circular scanning techniques can also be used to form ring-like or circular image swaths 110 as shown in FIG. 4B. In this example embodiment, circular image swaths 110 can be formed when controller 30 causes recording head 16 to emit radiation beams while maintaining recording head 16 at a first position 41 along sub-scan axis SSA and while moving media support 12 along a direction of main-scan axis MSA. In this regard, scanning occurs solely along a main-scan direction. After the completion of a first circular image swath 110, recording head 16 is moved to a second position 42 along sub-scan axis SSA. A second circular image swath 110 is then formed as recording head 16 is operated to emit radiation beams while maintaining recording head 16 at second position 42 and while moving media support 12 along a direction of main-scan axis MSA. Recording head 16 is shown in broken lines at second position 42 for clarity. In some example embodiments, the second circular image swath 110 is formed adjacently to the first circular image swath 110. In some example embodiments, the second circular image swath 110 and the first circular image swath 110 include overlapped regions. Selected parts of recording apparatus 10 have been removed for clarity in FIG. 4B.

Figure 1A:
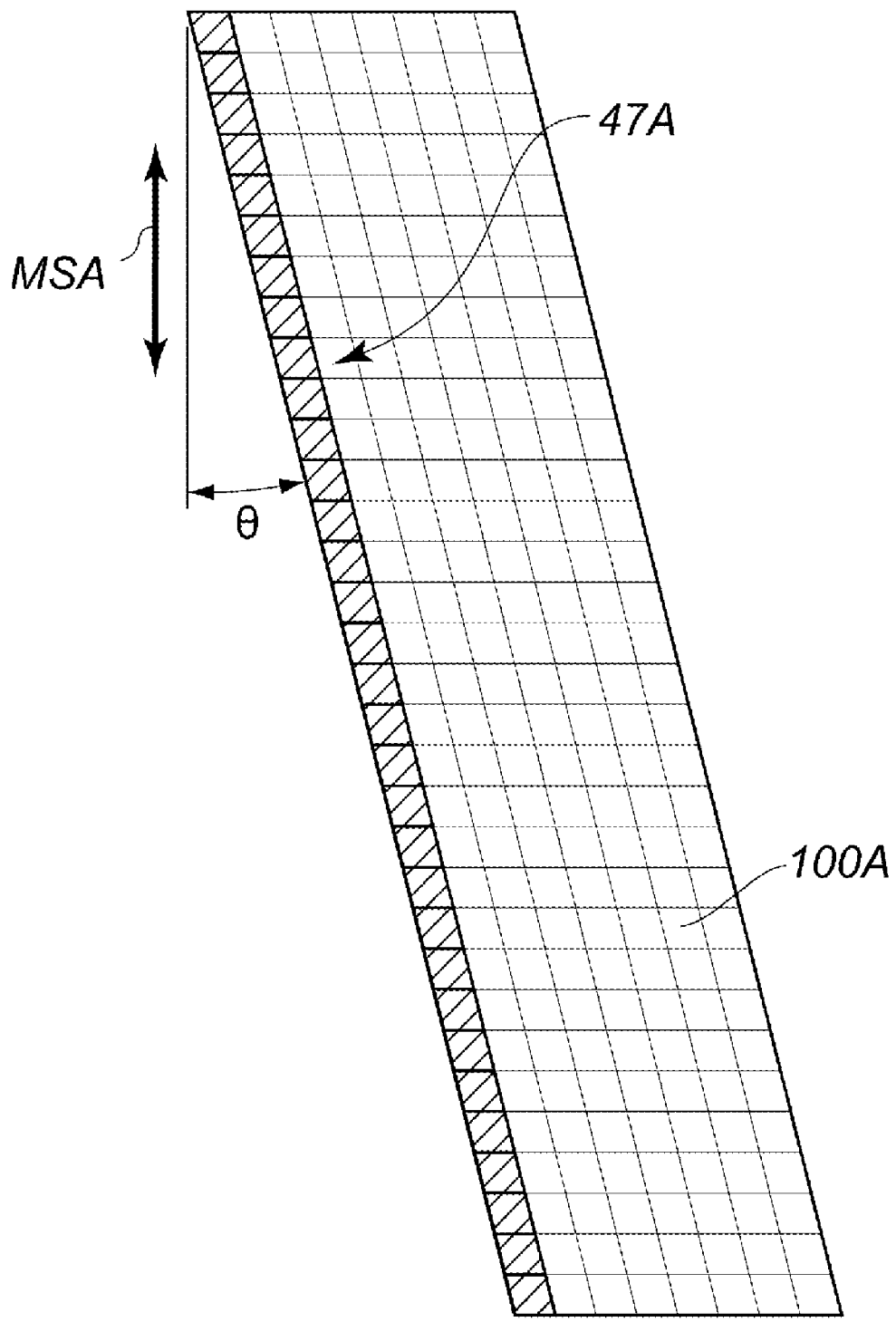
FIG. 1A shows an image feature formed in a conventional helical image swath.
Figure 1B:
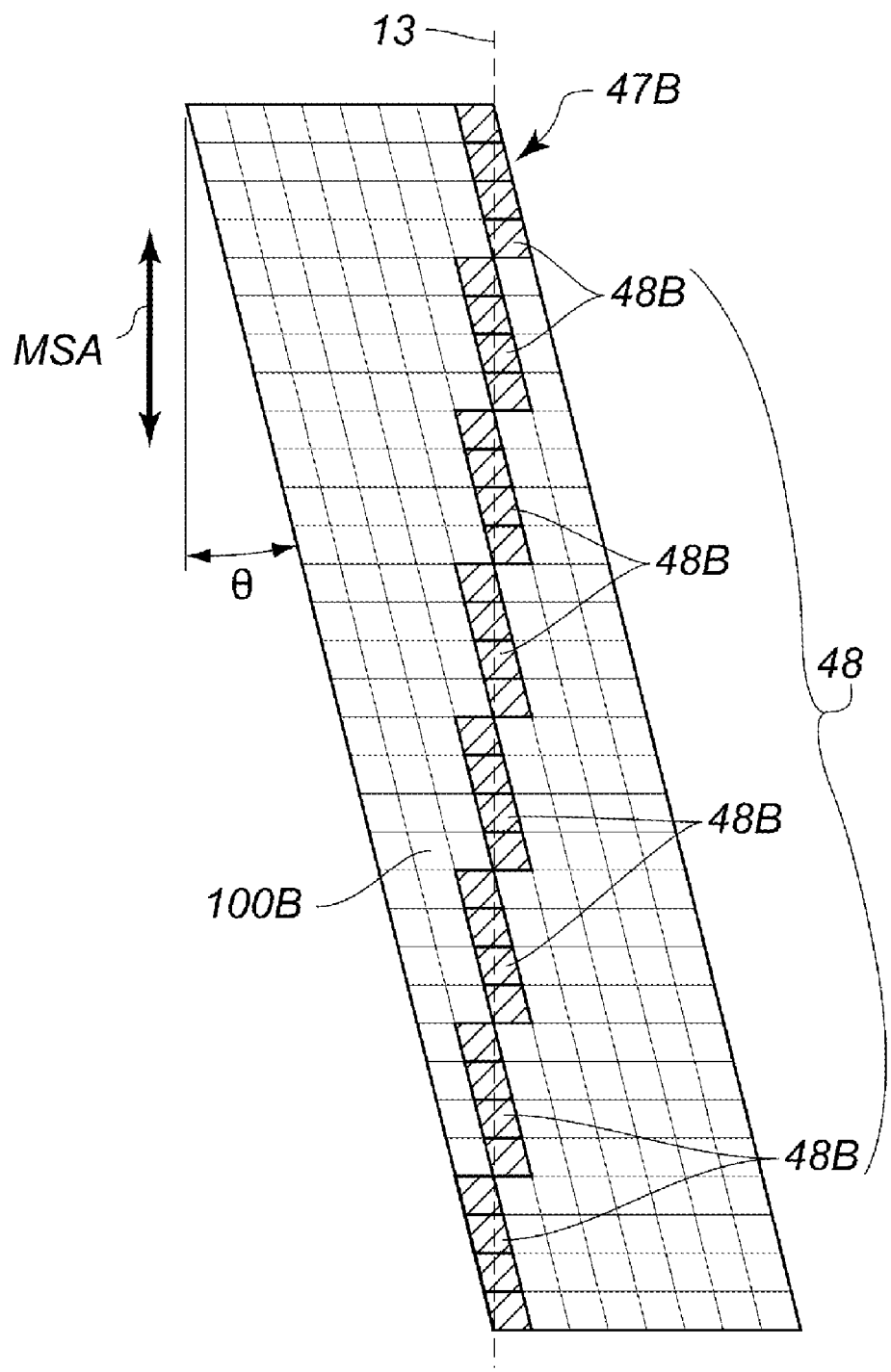
FIG. 1B shows the image feature of FIG. 1B formed with a conventional orthogonality correction technique.

Since a sub-scan movement in which no image forming actions are taken is required between each successive circular scan, circular scanning techniques typically suffer from lower image forming throughputs than those associated with helical scanning techniques. However, as previously described, helical scanning techniques can lead to various geometric distortions. Although various orthogonality correction techniques can be employed to correct for these distortions, these techniques may not be suitable for all applications. As previously shown in FIG. 1B, conventional orthogonality correction techniques can impart undesired shifts in the arrangement of image pixels that form various image features 47. Undesired changes in a visual or a functional property of an element corresponding to an image feature 47 can arise when the image feature is formed while applying conventional orthogonality techniques.

In steps 304 and 306 respectively, various ones of the arrangements of the image data 37 are analyzed to identify first image data portions corresponding to an image feature 47 that is to be orthogonality corrected and second image data portions corresponding to an image feature 47 that is not to be orthogonality corrected. In some example embodiments of the invention, the image feature 47 that is to be orthogonality corrected corresponds to a graphical element while the image feature 47 that that is not to be orthogonality corrected corresponds to an electrical element.

In step 308, recording head 16 is operated to helically scan across media 17 in the event that first image data portions are identified. In this example embodiment of the invention, orthogonality correction techniques are applied to the first image data portion to correct for distortions that can arise in various image features 47 formed during the helical scanning.

In step 310, recording head 16 is operated to circularly scan over media 17 in the event that second image data portions are identified. Advantageously, since sub-scan movement is not present during each of the circular scans, distortions such as orthogonality distortions are not present and orthogonality correction methods that can adversely impact a functional requirement of the various electrical elements are not employed.

Various embodiments of the present invention allows various image features 47 to be formed with increased image forming throughputs when formed with helical scanning techniques. These image features 47 can include image features that are suitably tolerant to the use of various conventional orthogonality correction techniques. Other image features 47 which are less tolerant to the use of various conventional orthogonality correction techniques can be formed with circular scanning techniques.

In some example embodiments of the invention, media 17 can include a plurality of media. Various ones of each media of the plurality of media can correspond to image data 37 pertaining to a particular color separation or to a particular functional separation. In some example embodiments of the invention, media 17 can include a plurality of printing elements which can include, but is not limited to a plurality of printing plates, a plurality of printing sleeves or a plurality of printing cylinders. In some example embodiments, various ones of image features 47 associated with a given image 19 are formed on a different printing element. In some example embodiments of the invention, media 17 can include a plurality of surfaces and various ones of image features 47 associated with a given image 19 are formed on different surfaces of the plurality of surfaces.

In some example embodiments, an image feature 47 that has been formed while applying orthogonality corrections is formed on a different media 17 than another image feature 47 that has been formed while not applying orthogonality corrections. In some example embodiments, an image feature 47 that is created while helically scanning is formed on a different media 17 than another image feature 47 that is created while circularly scanning.

In some example embodiments, graphical elements are printed separately from electrical features. For example, graphical elements can printed with a material comprising a desired color characteristic while electrical elements are printed with a material comprising a desired electrical characteristic (e.g. conductive or dielectric properties). In some example embodiments, electrical elements and graphical elements are printed at different print stations. In some example embodiments, image features 47 corresponding to electrical elements are formed on different media 17 than the media 17 that image features 47 corresponding to graphical elements are formed on. In some example embodiments, different media 17 are used during the printing of each of an electrical element and a graphical element.

In some example embodiments, image features 47 corresponding to electrical elements are formed on a same media 17 that image features 47 corresponding to graphical elements are formed on. In some example embodiments, the same media 17 is used in the printing of each of an electrical element and a graphical element. For example, image features 47 corresponding to both electrical elements and graphical elements can be formed on a common media 17 which can include a common printing plate, a common printing sleeve or a common printing cylinder by way of non-limiting example. The common media 17 can be used to apply a functional material comprising a particular electrical characteristic to form both the graphical elements and the electrical elements. In some example embodiments, the functional material additionally comprises specific color characteristics as required by an element. In some example embodiments, image features 47 corresponding to electrical elements can include graphical attributes as may be required in some applications.

In some example embodiments, an image feature 47 that has been formed while applying orthogonality corrections is formed on a same media 17 as another image feature 47 that has been formed while not applying orthogonality corrections. In some example embodiments, the differently formed image features 47 are formed on a same surface of the media 17.

In some example embodiments of the invention, recording head 16 is operated to form a combination helical image swaths 100 and circular image swaths 110 while scanning over a same media 17. In some example embodiments of the invention, recording head 16 is operated to form each of the image swaths in one of a set of helical image swaths 100 and a set of circular image swaths 110 prior to forming each of the image swaths in the other of the set of helical image swaths 100 and the set of circular image swaths 110. For example, recording head 16 can be operated to form each of the helical image swaths 100 prior to forming each of the circular image swaths 110. As previously described, each of the helical image swaths 100 is formed as recording head 16 is continuously moved along a first direction of sub-scan axis SSA while media support 12 is rotationally moved along a direction of main-scan axis MSA. In various embodiments of the invention, recording head 16 is moved along sub-scan axis SSA with a substantially constant speed, even if recording head 16 is operated not to undertake image forming actions during part of the movement (i.e. over a portion of media 17 over which a circular scan is to be undertaken). In some of these example embodiments of the invention, recording head 16 is moved along a second sub-scan direction opposite to the first sub-scan direction after the completion of the helical image swaths 100. Movement along the second sub-scan direction can be performed for various reasons including retracing recording head 16 to a position required for a next imaging for example. The speed of the recording head 16 along sub-scan axis SSA can be made to vary between the formation of one of the set of helical image swaths 100 and the set of circular image swaths 110 and the formation of the other of the set of helical image swaths 100 and the set of circular image swaths 110.

As previously described, each circular image swath 110 is formed while maintaining recording head 16 at fixed sub-scan position and as media support 12 is rotationally moved long a direction of main-scan axis MSA. Upon the formation of a first circular image swath 110, recording head 16 can be repositioned along sub-scan axis SSA for the formation of a second circular image swath 110. In some example embodiments, recording head 16 can be moved along sub-scan axis SSA with varying speeds between the formations of successively formed circular image swaths 110. A sub-scan speed of recording head 16 between two sub-scan positions may be motivated by the distance between the two positions, for example.

In some example embodiments of the invention, recording head 16 is operated to intersperse the formation of various helical image swaths 100 with the formation of various circular image swaths 110. Recording head 16 can be operated to sequentially form each image swath in a spatially continuous series of interspersed helical image swaths 100 and circular image swaths 110 such that each image swath in the spatially continuous series is sequentially formed in accordance with its order in the spatially continuous series. In some of these example embodiments, the speed with which recording head 16 is moved along sub-scan axis SSA is varied as a transition from the formation of one type of image swath to the formation of another type of image swath is required. For example, if recording head 16 is being moved along a first sub-scan direction while forming a helical image swath 100, its movement will require a deceleration to a zero speed to form a circular image swath 110. If the circular image swath 110 is positioned adjacently to the helical image swath 100, finite deceleration parameters can additionally require recording head 16 to retrace or additionally move along second sub-scan direction opposite to the first sub-scan direction to ensure that recording head 16 has sufficient distance to be correctly positioned for the formation of the circular image swath 110.

Conversely, if recording head 16 has just completed the formation of a first circular image swath 110 and is to next form a helical image swath 100, then a movement of recording head 16 in which it accelerates to a sub-scan speed suitable for the helical scanning is required. After the formation of the first circular image swath 110, finite acceleration parameters can require recording head 16 to be retraced prior to accelerating recording head 16 to achieve a correct sub-scan speed and a correct positioning required by the formation of the helical image swath 100. In some example embodiments, recording head 16 reciprocates along a portion of path traveled between the formation of one of a helical image swath 100 and a circular image swath 110 and the formation of the other of the helical image swath 100 and the circular image swath 110. Various encoders known in the art can be used to facilitate to the correct positioning of recording head 16. Various encoders known in the art can be used to synchronize a movement of recording head 16 with a movement of media support 12.

Figure 5A:
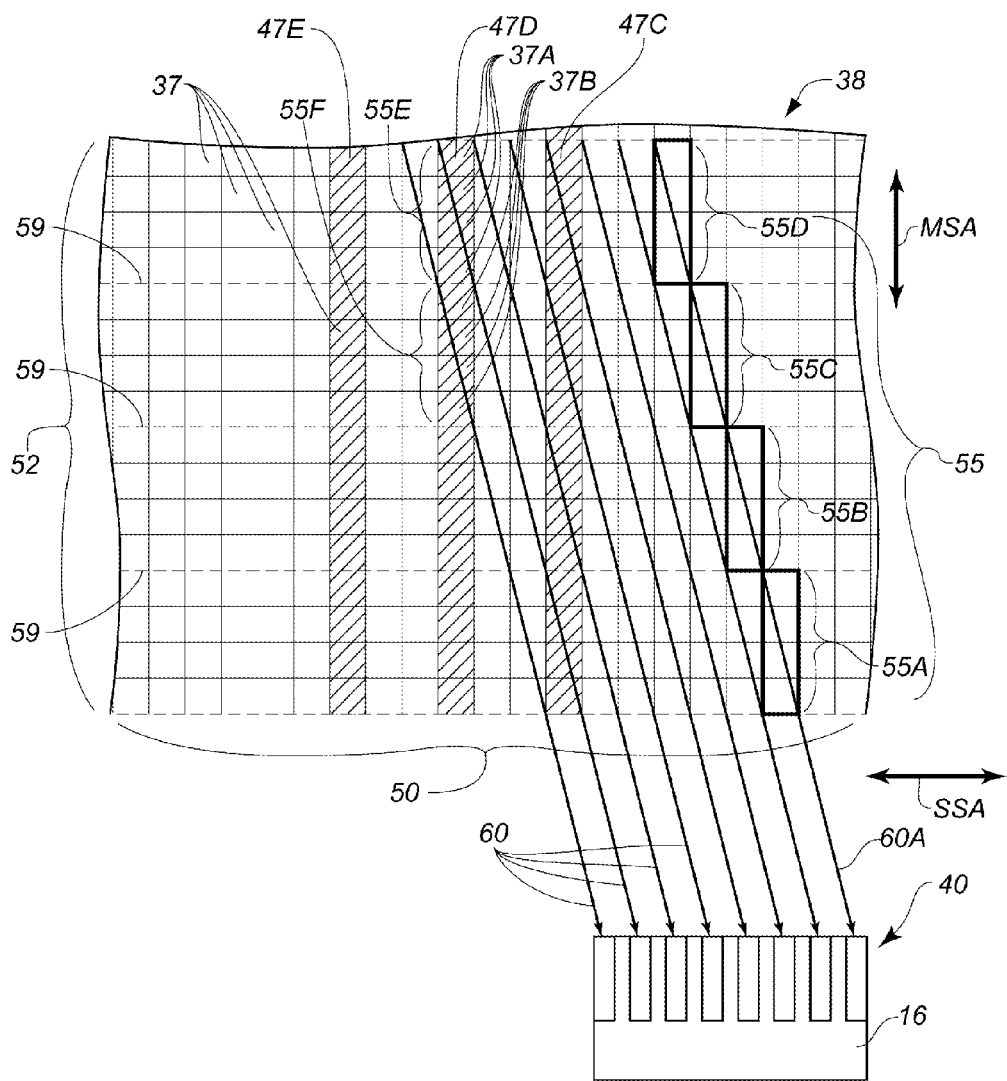
FIG. 5A schematically shows image data arranged in portion of an image data file and its assignment to various recording channels of a recording head.

FIG. 5A schematically shows image data 37 representative of an image 19 arranged in portion of an image data file 38. FIG. 5A additionally schematically represents an assignment of various image data 37 to various recording channels 40 of recording head 16. In this example embodiment, image data file 38 includes a matrix in which image data 37 is arranged in image data columns 50 and image data rows 52. In some example embodiments, image data 37 is arranged in a raster bitmap. In this example embodiment, each image data 37 is represented by a cell in the matrix. Each cell corresponds to an image pixel that can be formed on media 17 by a recording channel 40 of recording head 16. In this example embodiment, each image data column 50 corresponds to a desired arrangement of image pixels along a direction of main-scan axis MSA (e.g. a raster line) while each image data row 52 corresponds to an arrangement of image pixels along a direction of sub-scan axis SSA. The arrangement of image data 37 includes various "non-zero" image data 37 which is made up information that when assigned to recording head 16, causes recording head 16 to form image pixels representative of areas of media 17 that are to be marked, and various "zero" image data 37 which is made up of information that when assigned to recording head 16, causes recording head 16 to form image pixels representative of areas of media 17 that are not to be marked. Cells corresponding to non-zero image data 37 are patterned in FIG. 5A to distinguish them from cells corresponding to zero image data 37 which are shown unpatterned.

In this example embodiment, image data file 38 includes image data 37 corresponding to image features 47C, 47D, and 47E. As shown in FIG. 5A, each of image features 47C, 47D, and 47E correspond to a column of non-zero image data 37. In this example embodiment, its is desired that each of the image features 47C, 47D, and 47E be formed on media 17 with orientations that are substantially parallel to main-scan axis MSA. In this example embodiment, it is further desired that image feature 47D be formed with image data 37 which is not orthogonality corrected while image features 47C and 47E be formed with image data 37 that has been orthogonality corrected. In this example embodiment, it is desired that image feature 47D be formed while circularly scanning over media 17, and that image features 47C and 47E be formed while helically scanning over media 17.

The application of orthogonality corrections to various image data 37 employed during each of the helical scans can be performed in various ways. In this example embodiment, orthogonality corrections are made by reading skewed image data columns 60 to recording head 16 to compensate for distortions created by the helical scanning. That is, rather than reading out an entire image data column 50 to a given recording channel 40 which would impart a skewed orientation to image features 47 formed during a helical scan (e.g. image feature 47A in FIG. 1A), different image data portions 55 from each of a plurality of image data columns 50 are assigned to different recording channels 40 via a skewed image data column 60. For clarity, each skewed image data column 60 is schematically represented by as an arrow incorporating different image data portions 55 corresponding to that particular skewed image data column 60. For example, skewed image data column 60A includes a plurality of image data portions 55A, 55B, 55C, and 55D. Each of image data portions 55A, 55B, 55C, and 55D has been outlined in bolded lines for clarity.

In this example embodiment, each image data portion 55 assigned to a given skewed image data column 60 is selected from a different image data column 50. Each skewed image data column 60 is schematically shown assigned to particular recording channel 40 of recording head 16. In some example embodiments, the number of skewed image data columns 60 that is read out is motivated by the number of recording channels 40 that are to be employed during a particular scan. In this example embodiment, various image data portions 55 transition from one to another in a given skewed image data column 60 at locations on image data shift lines 59 which are schematically represented by broken lines.

In this example embodiment, image data 37 in each skewed image data column 60 is read out along a direction that is skewed with respect to an arrangement direction of the image data 37 within image data columns 50. In this example embodiment, each image data portion 55 is sized to cause associated skewed image data columns 60 to compensate for orthogonality distortion effects associated with the helical scanning. In this example embodiment, each image data portion 55 is sized in accordance with a helical scan angle θ associated with recording apparatus 10. In some example embodiments, media 17 can be located on media support 12 such that an edge of media 17 is skewed with respect to sub-scan axis SSA. In these embodiments, each image data portion 55 can be sized to correspond to both the helical scan angle θ and the skew associated with the placement of the recording media edge to thereby compensate for both these effects.

In this example of the invention, each image data portion 55 is sized based at least on the number of recording channels 40 that are to be employed during the formation of a given image swath, various resolutions of recording channels 40 to be formed on media 17, and an applicable main-scan distance associated with each image swath to be formed. In this example embodiment, the applicable main-scan distance corresponds to a circumferential distance associated with cylindrical surface 15 and a thickness of media 17.

FIG. 5A indicates that a potential problem exists as image data 37 is read out along various skewed image data columns 60 to form an orthogonality corrected image feature 47C during an associated helical scan. Specifically, the image data 37 that is read out to recording head 16 along various skewed image data columns 60 includes image data 37 representative of image feature 47D. As previously stated, image feature 47D was identified as an image feature 47 which was deemed to be not suited for the application of orthogonality corrections. In this case, the image data file 38 includes various image data portions 55 (e.g. image data portions 55E and 55F) that if assigned via various skewed image data columns 60 to associated recording channels 40 during the formation of image feature 47C would also lead to an undesired placement of image pixels 45 that form a portion of image feature 47D. In this regard, the image data 37 that is required to form an orthogonality corrected image feature 47C undesirably includes image data 37 representative of a portion of image feature 47D.

Figure 5B:
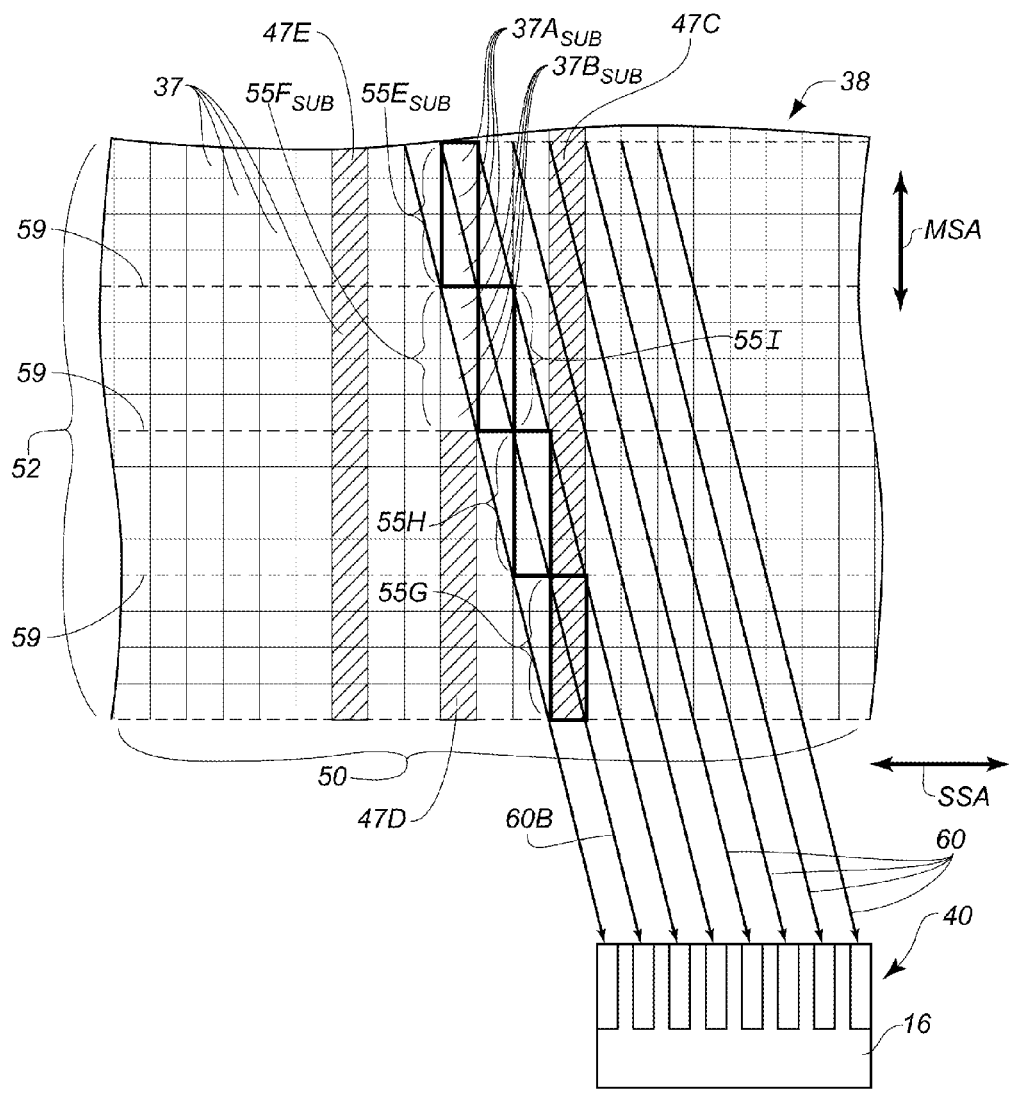
FIG. 5B shows image data in the image data file of FIG. 5A that is substituted with zero image data in accordance with the formation of a desired helical scan.

In one example embodiment of the invention, this problem is addressed by substituting image data 37 in one or more of the image data portions 55 assigned to a particular recording channel 40 with a zero image data. For example, FIG. 5A shows first image data portion 55E includes various first image data 37A representative of a portion of image feature 47A. As shown in FIG. 5B, first image data 37A is substituted with zero image data to form substituted first image data $37A_{SUB}$ which is shown un-patterned. In a similar fashion, image data 37B in image data portion 55F is also substituted with zero image data 37 to form substituted image data $37B_{SUB}$. In this regard, image data portions 55E and 55F are respectively transformed into substituted first image data portions $55E_{SUB}$ and $55F_{SUB}$. It is to be noted that the substitution of various image data 37 with zero image data need not occur within image data file 38 itself. For example, various image data 37 in image data file 38 can be provided to a computer readable memory adapted to perform the substitutions therewithin.

Figure 6A:
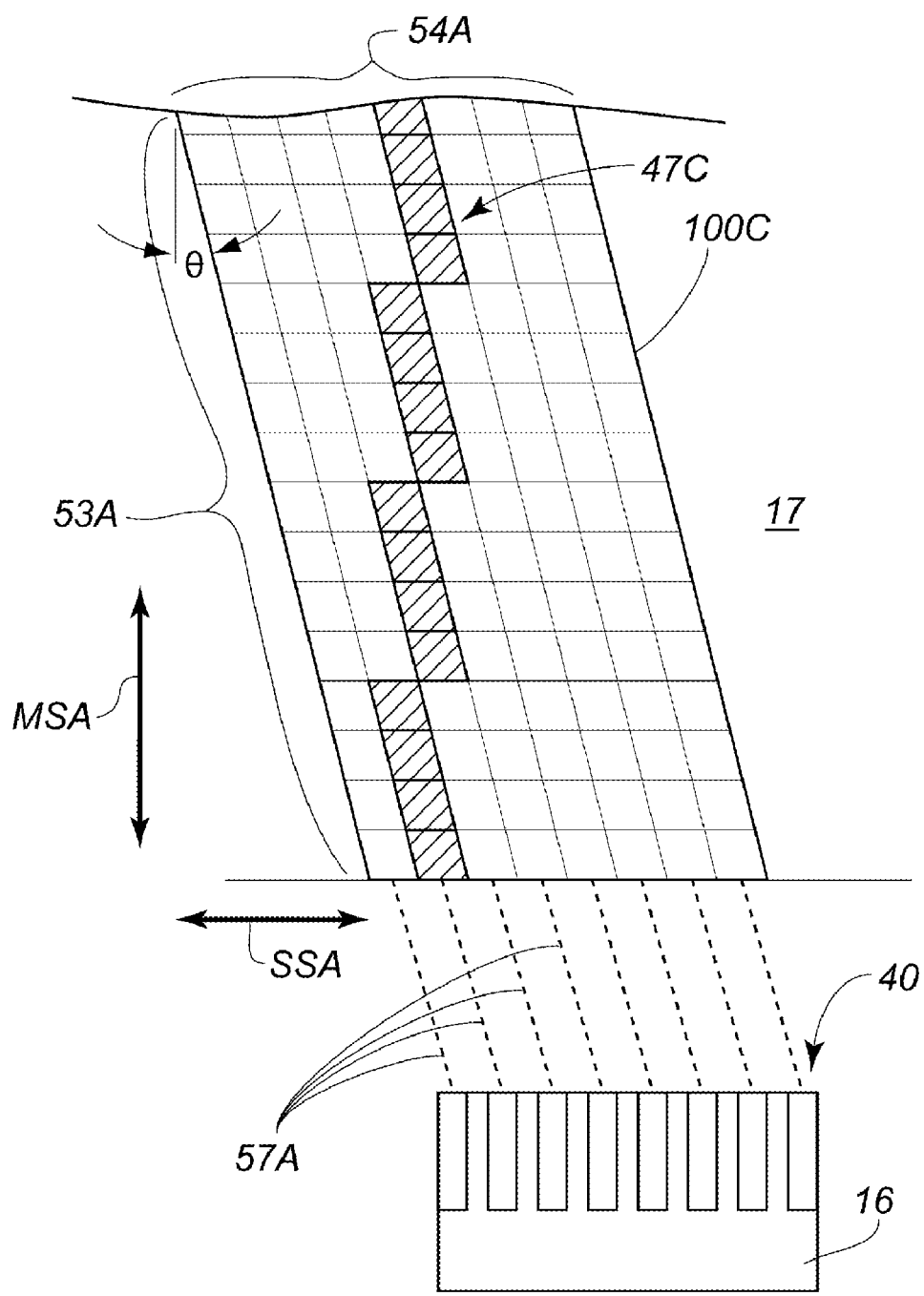
FIG. 6A shows the formation of a helical image swath in accordance with the image data of FIG. 5B.

As shown in FIG. 6A, recording head 16 is then operated to form a helical image swath 100C during a first scan. Helical image swath 100C includes an image pixel matrix comprising a plurality of image pixel rows 53A and plurality of image pixel columns 54A. Each image pixel column 54A is formed by a corresponding recording channel 40 as represented by broken lines 57A. In this example embodiment, the helical scanning causes each image pixel column 54A to be skewed relative to main-scan axis MSA by a skew angle corresponding to helical scan angle θ. Helical image swath 100C is formed in accordance with various image data 37 provided via the skewed image data columns 60 during a first scan. Since this image data 37 includes the zero image data that was substituted into first image data portion 55E, both the substituted first image data portion $55E_{SUB}$ and other image data portions 55 from other image data columns 50 (e.g. second image data portions 55G, 55H, and 55I) can be assigned to a particular recording channel via a particular skewed image data column to form a portion of an orthogonality corrected image feature 47C without forming a portion of image feature 47D during the helical scan. Substituted first image data portion $55E_{SUB}$ and each of image data portions 55G, 55H, and 55I form part of skewed image data column 60B and each of these image data portions has been outlined in bolded lines for clarity.

Figure 5C:
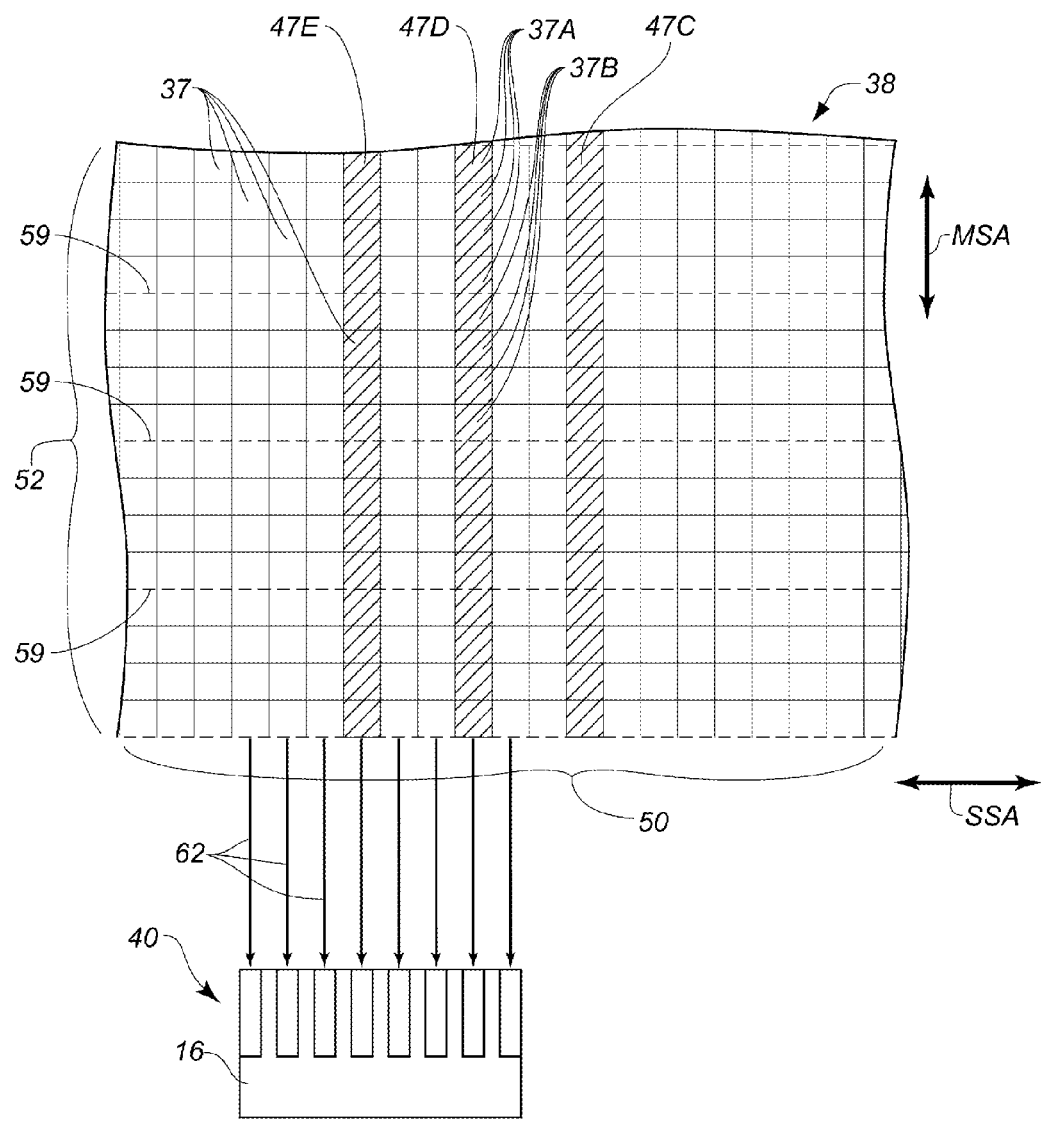
FIG. 5C shows image data in the image data file of FIG. 5A that is assigned to the recording head in accordance with the formation of a desired circular scan.

As shown in FIG. 5C, image data 37 from image data file 38 is assigned to recording head 16 for a second scan over media 17. This image data includes image data 37 corresponding to image feature 47D. Since it is desired that image feature 47D be formed from image data 37 that has not been orthogonality corrected, image feature 47D is to be formed while circularly scanning over recording apparatus 10. Accordingly image data 37 is not assigned to each recording channel 40 via a skewed image data column 60 but rather directly though each of the image data columns 50 as shown by arrows 62. In this example embodiment of the invention, various image data 37 corresponding to image feature 47D (i.e. including the original first image data 37A and 37B) is directly assigned to a recording channel 40 as shown in FIG. 5C.

Figure 6B:
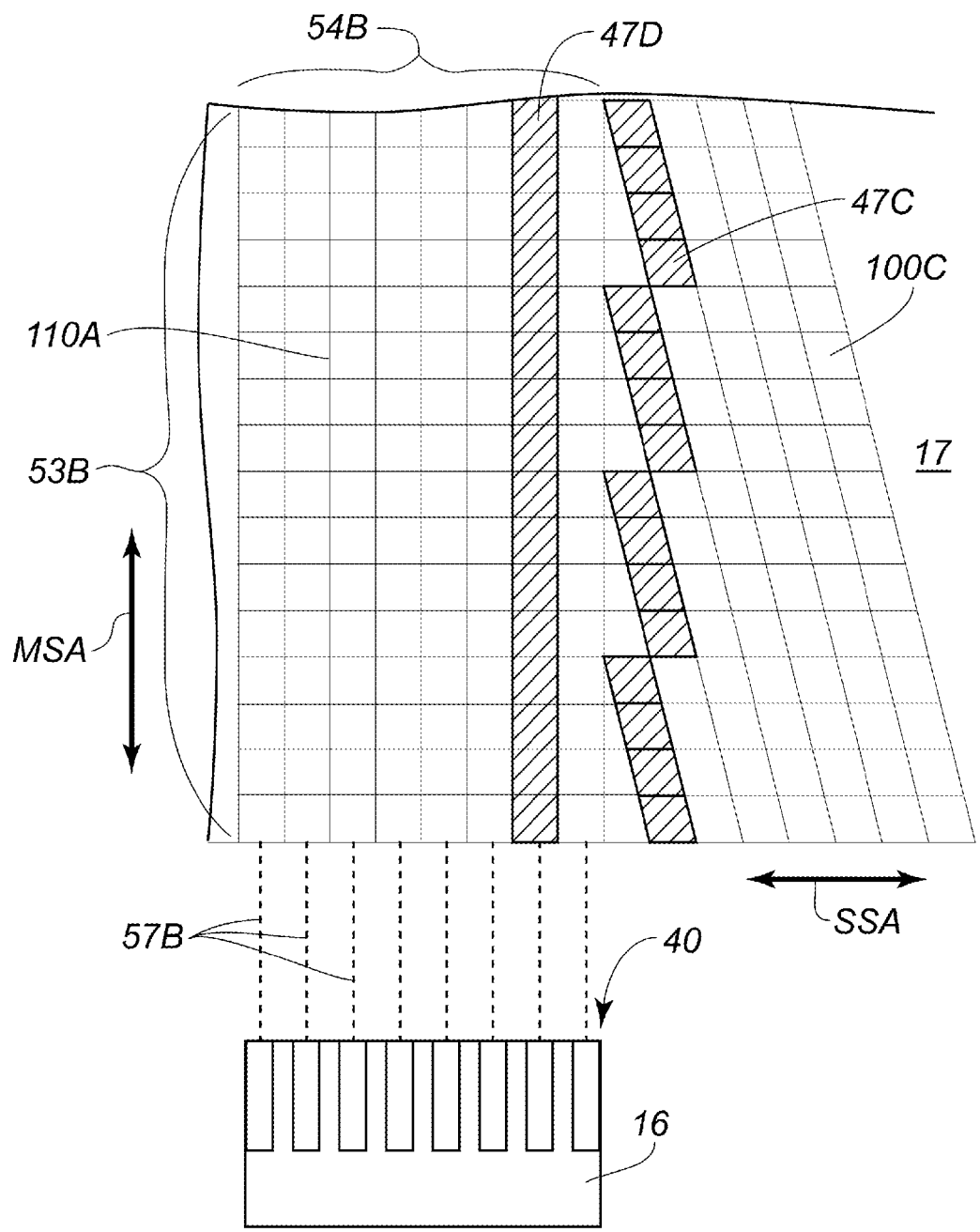
FIG. 6B shows the formation of a circular image swath in accordance with the image data of FIG. 5C.

As shown in FIG. 6B, recording head 16 is positioned to form a circular image swath 110A during a second scan in accordance with the image data 37 assigned to recording head 16 in FIG. 5C. As shown in FIG. 6B, circular image swath 110A includes an image pixel matrix comprising a plurality of image pixel rows 53B and plurality of image pixel columns 54B. Each image pixel column 54B is formed by a corresponding recording channel 40 as represented by broken lines 57B. In this example embodiment, the circular scanning causes the image pixel columns 54B to be formed substantially parallel to main-scan axis MSA. In this example embodiment, circular image swath 110A overlaps a region of media 17 that was scanned during the formation of helical image swath 100C. As desired, image feature 47D is formed without the image pixel shifts that typically accompany various orthogonality corrected image features 47. In this example embodiment, image pixel rows 53B are formed in aligned relationship with corresponding image pixels rows 53A that were formed during the first scan.

Referring back to FIG. 5C, it is apparent that an entire image swath's worth of image data 37 has been provided to recording head 16 in this example embodiment. This image data 37 includes image data representative of image feature 47E which was deemed to be an image feature that could be formed with image data 37 that was orthogonality corrected. In some example embodiments, various practitioners of the present invention may forego their desire to form image feature 47E from un-orthogonalized image data and thereby additionally form image feature 47E along with image feature 47D in circular image swath 110A. Those skilled in the art will realize that additional penalties in the throughput of these image forming activities is not incurred if image feature 47E is additionally formed with image feature 47D in circular image swath 110A. The choice to form, or not form, a portion of an image feature 47 such as image feature 47E in circular image swath 110A can be motivated by various factors including stitching issues that may arise from a requirement to form an additional portion of the image feature 47 in a subsequent helical swath 100.

In this example embodiment, image feature 47E is not formed in circular image swath 110A. In some embodiments of the present invention this is accomplished by substituting image data 37 corresponding to image feature 47E with zero image data and forming a portion of circular image swath 110A with the substituted image data. In other example embodiments this is accomplished by disabling particular recording channels 40 to which image data 37 corresponding to image feature 47E is assigned during the formation of circular image swath 110A.

Figure 5D:
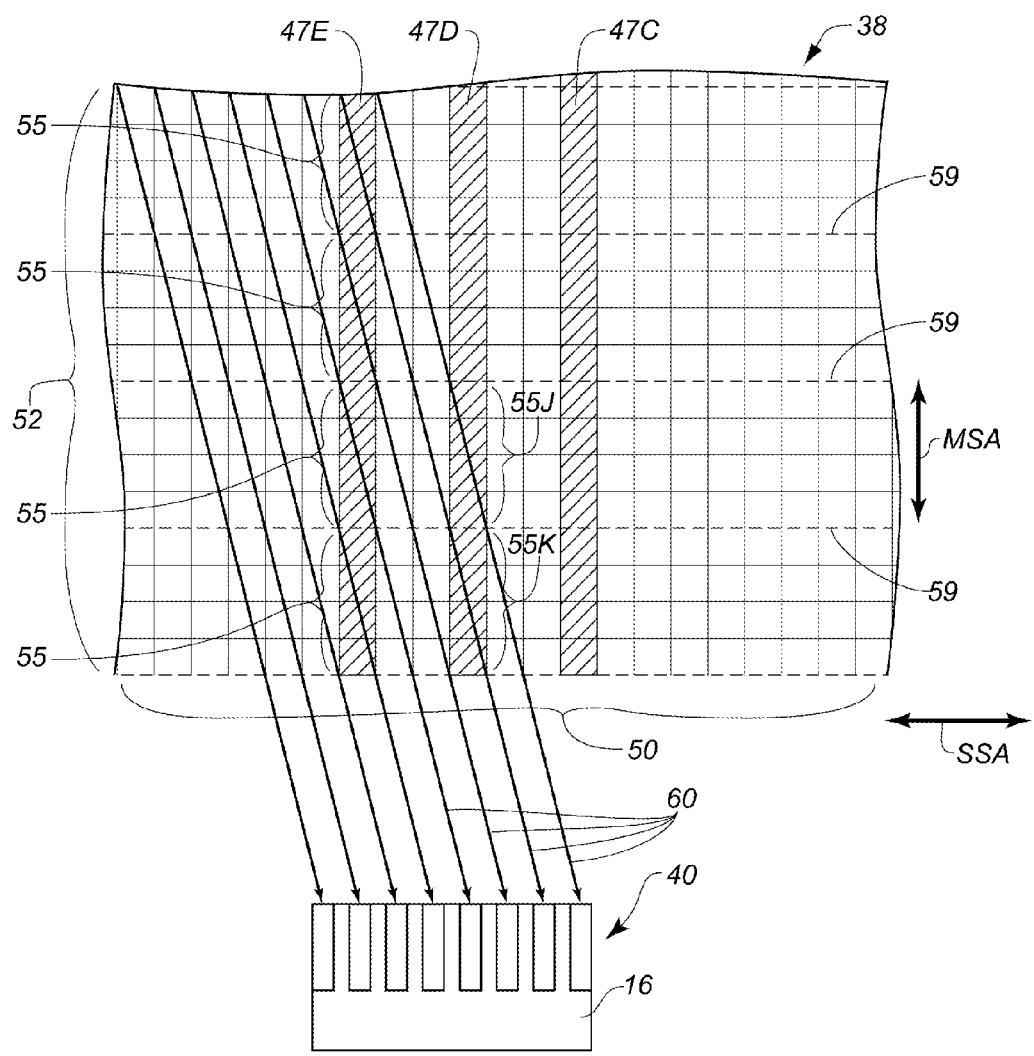
FIG. 5D shows image data in the image data file of FIG. 5A that is to be assigned to recording head 16 in accordance with the formation of another desired helical scan.

In this example embodiment, the decision to form image feature 47E in a helical image swath 100 with orthogonality corrected image data 37 is maintained. As shown in FIG. 5D, image data 37 from image data file 38 is assigned to recording head 16 for a third scan over media 17. This image data includes image data 37 corresponding to image feature 47E. Since it is desired that image feature 47E be formed from image data 37 that been orthogonality corrected, various image data 37 is assigned to recording head 16 via skewed image data columns 60 in a manner similar to those previously disclosed. In this example embodiment of the invention, each of the various image data portions 55 of the image data column 50 comprising image data 37 representing image feature 47E is assigned to a different recording channel 40 along with other image data portions 55 from other image data columns 50. As shown in FIG. 5D, some of these other image data portions 55 include image data portions 55J and 55K which contain image data 37 representative of image feature 47D. Since there is no desire to form image feature 47D with orthogonality corrected image data 37 and since image feature 47D was previously formed in circular image data swath 110A, image data 37 in image data portions 55J and 55K is subsequently substituted with zero image data 37 in a manner similar to that previously disclosed. This substitution is not shown in FIG. 5D.

Figure 6C:
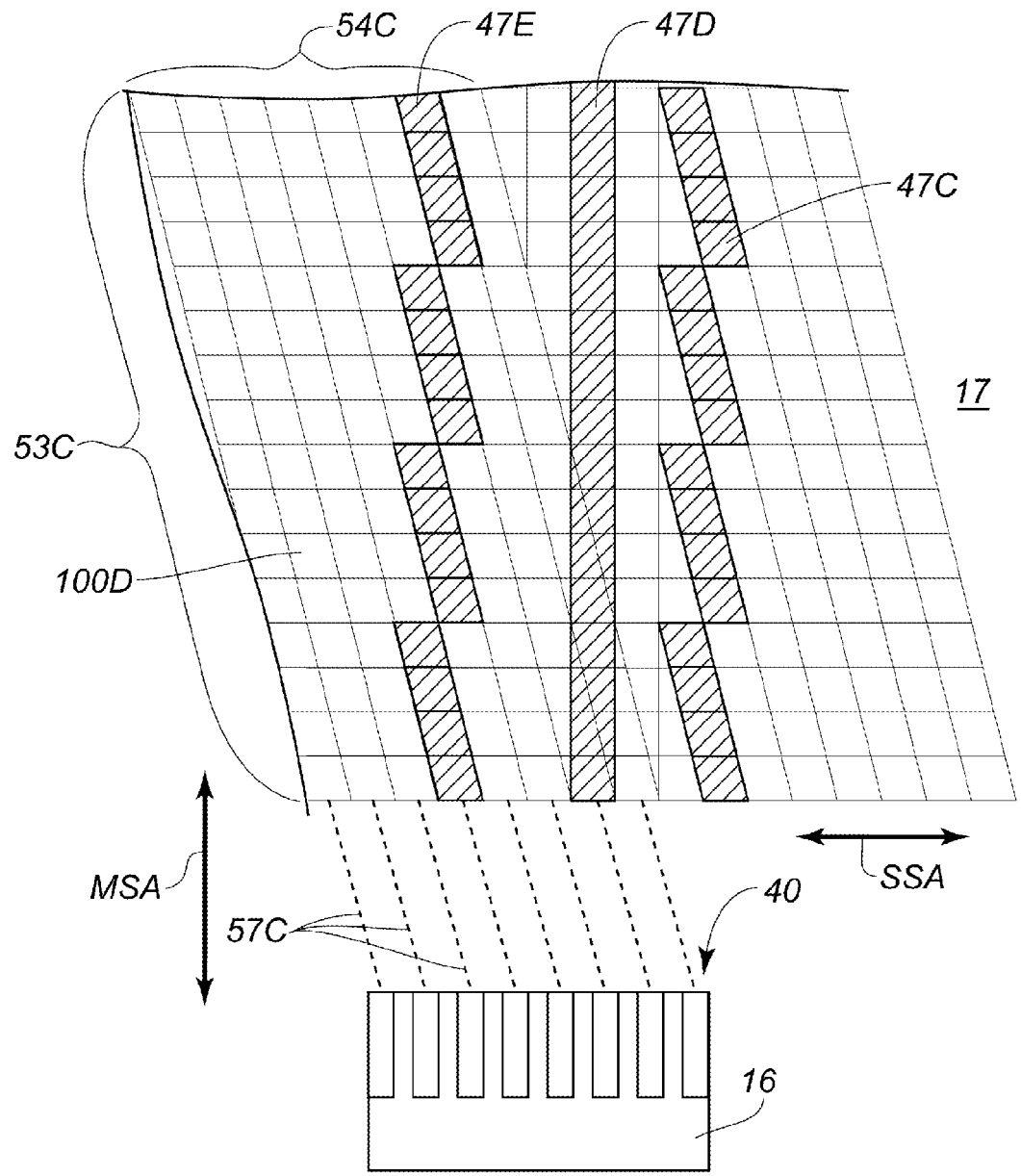
FIG. 6C shows the formation of a helical image swath in accordance with the image data of FIG. 5D.

As shown in FIG. 6C, recording head 16 is positioned to form a second helical image swath 100D during a third scan in accordance with the image data 37 and the substituted image data 37 that have been assigned to recording head 16 in FIG. 5D. As shown in FIG. 6C, helical image swath 100D includes an image pixel matrix comprising a plurality of image pixel rows 53C and plurality of image pixel columns 54C. Each image pixel column 54C is formed by a corresponding recording channel 40 as represented by broken lines 57C. In this example embodiment, image pixel columns 54C are formed in a skewed orientation with main-scan axis MSA in a manner similar to image pixel columns 54C. In this example embodiment the image pixels rows 53C are formed in aligned relationship with image pixel rows 53A and 53B. In this example embodiment, helical image swath 100D overlaps a region of media 17 that was scanned during the formation of circular image swath 110A. In this example embodiment, the sub-scan position of recording head 16 at the start of the helical scan corresponding to helical image swath 100D is the same as the sub-scan position of recording head 16 at the start of the circular scan corresponding to circular image swath 110A. As desired, image feature 47E is formed in accordance with orthogonality corrected image data 37 in helical image swath 42D without overwriting the previously formed image feature 47D since image data 37 corresponding to various portions of image feature 47D was substituted with zero image data.

In some example embodiments, the selection of a particular scanning technique is made on the basis of the type of image feature 47 that is to be formed. Some example embodiments of the invention can include determining if an image feature 47 corresponds to an electrical element or a graphical element and in the event that the image feature 47 is determined to correspond to the electrical element, the image feature 47 is formed during a circular scan. In some example embodiments, the image feature 47 is formed during a helical scan in the event that the image feature 47 is determined to correspond to the graphical element.

In some example embodiments of the invention, orthogonality correction techniques are selectively applied on the basis of the type of image feature 47 that is to be formed. Some example embodiments of the invention can include determining if an image feature 47 corresponds to an electrical element or a graphical element and forming the image feature 47 with image data 37 that has not been orthogonality corrected in the event that the image feature 47 is determined to correspond to the electrical element. In some example embodiments, the image feature 47 is formed with image data 37 that has been orthogonality corrected in the event that the image feature 47 is determined to correspond to the graphical element. In some example embodiments, orthogonality corrections can be selectively applied to image data 37 representative of different types of graphical elements, or to image data 37 representative of different types of electrical elements.

In some example embodiments, recording head 16 is operated to scan over media support 12 along a first direction to form a first image feature 47 in accordance with first image data 37 that is orthogonality corrected, and scan along a second direction to form a second image feature 47 in accordance with second image data 37 that is not orthogonality corrected. In some example embodiments, the first direction is different from the second direction. In some example embodiments, the first direction is parallel to the second direction. In other example embodiments, the first direction is opposite to the second direction. In yet other example embodiments, the first direction is the same as the second direction. For example, helical scans can be employed during the formation of first image features 47 in accordance with image data 37 that has been orthogonality corrected and during the formation of second image features 47 that are formed in accordance with image data 37 that has not been orthogonality corrected. It is to be noted however that potential variances from the desired positional relationships between these first image features 47 and these second image features 47 may require consideration in these example embodiments.

Various example embodiments of the present invention have been described in conjunction with orthogonality correction methods in which image data 37 is read out along skewed image data columns 60. The present invention is not limited to these embodiments and those skilled in the art will now realize that the present invention can easily be adapted for use with other orthogonality correction techniques. By way of non-limiting example, other orthogonality correction techniques can include shifting image data 37 in an un-orthogonalized image data file 38 in a computer-readable memory, such that the shifts in the image data 37 are made based at least on the skew angle associated with the skewed printing system. Shifts are typically made in a direction opposite to an arrangement direction of the un-orthogonalized image data file 38 that corresponds to sub-scan direction along which recording head 16 is conveyed while scanning. In these example embodiments, different portions of image data 37 from each of the image data columns 50 in the image data file 38 are still assigned to different recording channels 40.

The invention has been described in detail with particular reference to certain preferred embodiments thereof, but it will be understood that variations and modifications can be effected within the scope of the invention.

PARTS LIST 10 recording apparatus
11 support
12 media support
13 broken line
14 rotation axis
15 cylindrical surface
16 recording head
17 media
18 carriage
19 image
22 motion system
28A clamping member
28B clamping member
30 controller
32 guide system
33 transmission member
37 image data
37A first image data
37A$_{SUB}$ substituted first image data
37B image data
37B$_{SUB}$ substituted image data
38 image data file
40 recording channel
41 first position
42 second position
47 image feature
47A image feature
47B image feature
47C image feature
47D image feature
47E image feature
48 image feature portions
48B image feature portion
50 image data columns
52 image data rows
53A image pixel rows
53B image pixel rows
53C image pixel rows
54A image pixel columns
54B image pixel columns
54C image pixel columns
55 image data portions
55A image data portion
55B image data portion
55C image data portion
55D image data portion
55E first image data portion
55E$_{SUB}$ substituted first image data portion
55F image data portion
55F$_{SUB}$ substituted image data portion
55G second image data portions
55H second image data portions
55I second image data portions
55J image data portion
55K image data portion
57A broken lines
57B broken lines
57C broken lines
59 image data shift line
60 skewed image data column
60A skewed image data column
60B skewed image data column
62 arrows
100 helical image swaths
100A helical image swath
100B helical image swath
100C helical image swath
100D helical image swath
110 circular image swaths
110A circular image swaths
300 method
302 provide image data file
304 identify image data corresponding to image feature that is to be orthogonality corrected
306 identify image data corresponding to image feature that is not to be orthogonality corrected
308 helically scan
310 circularly scan
θ helical scan angle
MSA main-scan axis
SSA sub-scan axis

The invention claimed is:

1. A method for forming an image, comprising:
providing a media support adapted to receive media;
providing a recording head comprising a plurality of recording channels, wherein each recording channel is adapted to form an image pixel column while scanning over the media;
providing an image data file comprising a plurality of image data columns including a first image data column and a second image data column;

assigning different portions of each of the first image data column and the second image data column to different recording channels;

substituting first image data assigned to a first recording channel from the first image data column with zero image data, and operating the first recording channel to form a first image pixel column in accordance with at least the zero image data and second image data assigned to the first recording channel from the second image data column;

operating the recording head to form the image;

comprising assigning the first image data to a second recording channel; and wherein the first image pixel column is formed while scanning along a first direction, and the method comprises operating the second recording channel to form a second image pixel column in accordance with at least the first image data, wherein the second image pixel column is formed while scanning along a second direction that is different than the first direction.

2. A method according to claim 1, wherein each of the first image pixel column and the second image pixel column are formed during different scans.

3. A method according to claim 2, wherein the second image pixel column is formed after the first image pixel column is formed.

4. A method according to claim 2, wherein the second image pixel column is formed before the first image pixel column is formed.

5. A method according to claim 1, comprising forming the second image pixel column solely in accordance with image data assigned from a single image data column.

6. A method according to claim 1, wherein the first image pixel column extends along a direction that intersects a direction that the second image pixel column extends along.

7. A method according to claim 1, comprising forming the first image pixel column in accordance with image data to which orthogonality corrections have been applied, and forming the second image data column in accordance with image data to which orthogonality corrections have not been applied.

8. A method according to claim 1, comprising determining if the second image pixel column is to be formed while scanning along a direction that is different from the first direction, and substituting the first image data with the zero image data in the event that it is determined that second image pixel column is to be formed while scanning along the direction that is different from the first direction.

9. A method according to claim 1, comprising forming the first image pixel column while helically scanning over the media and forming the second image pixel column while circularly scanning over the media.

10. A method according to claim 1, wherein the first image data corresponds to a portion of an electrical element.

11. A method according to claim 10, wherein the electrical element is one of a conductor, a resistor, an inductor, a capacitor, a rectifier, a transistor, an opto-electronic device, a microwave device, and an acoustical device.

12. A method according to claim 11, wherein the media includes a media adapted to transfer a functional material to a substrate.

13. A method according to claim 12, comprising forming a portion of the electrical element on the substrate with the functional material.

14. A method for forming an image, comprising:

providing a media support adapted to receive media;

providing a recording head comprising a plurality of recording channels, wherein each recording channel is adapted to form an image pixel column while scanning over the media;

providing an image data file comprising a plurality of image data columns including a first image data column and a second image data column;

assigning different portions of each of the first image data column and the second image data column to different recording channels;

substituting first image data assigned to a first recording channel from the first image data column with zero image data, and operating the first recording channel to form a first image pixel column in accordance with at least the zero image data and second image data assigned to the first recording channel from the second image data column;

operating the recording head to form the image;

comprising assigning the first image data to a second recording channel;

wherein each of the first image pixel column and the second image pixel column are formed during different scans; and wherein the first image pixel column is formed during a first scan in accordance with at least image data read from the first image data column along a first image data path that is skewed with the first image data column, and wherein the second image data column is formed during a second scan in accordance with image data read from the first image data column along a second image data read path that is parallel to the first image data column.

15. A method for forming an image, comprising:

providing a media support adapted to receive media;

providing a recording head comprising a plurality of recording channels, wherein each recording channel is adapted to form an image pixel column while scanning over the media;

providing an image data file comprising a plurality of image data columns including a first image data column and a second image data column;

assigning different portions of each of the first image data column and the second image data column to different recording channels;

substituting first image data assigned to a first recording channel from the first image data column with zero image data, and operating the first recording channel to form a first image pixel column in accordance with at least the zero image data and second image data assigned to the first recording channel from the second image data column;

operating the recording head to form the image;

comprising assigning the first image data to a second recording channel; and comprising determining if orthogonality corrections are to be applied to the first image data and substituting the first image data with the zero image data in the event that it is determined that the orthogonality corrections are not to be applied to the first image data.

* * * * *